(No Model.)
G. H. GARDNER.
PRIMARY BATTERY.
No. 543,931. Patented Aug. 6, 1895.
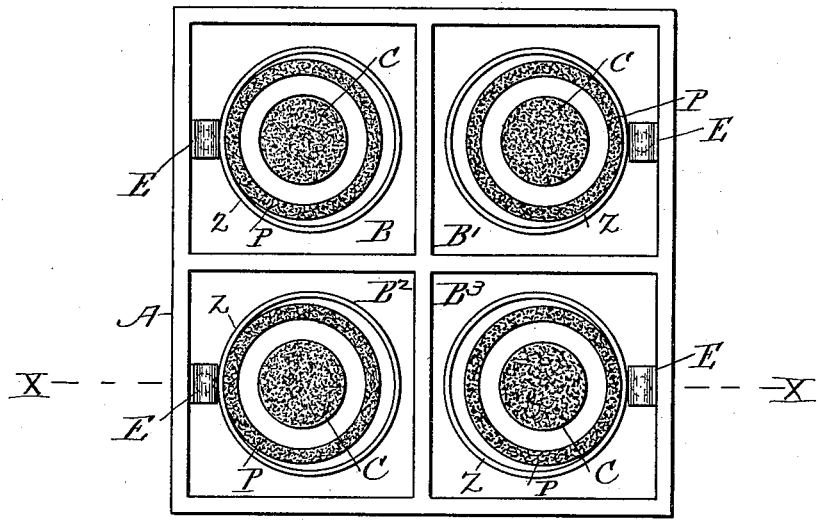
Fig. 1.
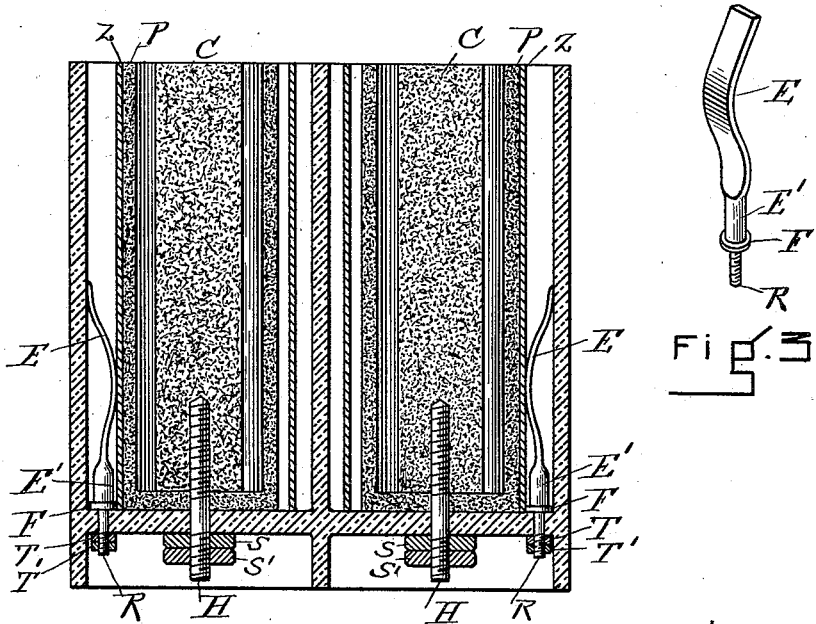
Fig. 2.
Fig. 3.
WITNESSES
Frank G. Parker
William Edson
INVENTOR
George H. Gardner

UNITED STATES PATENT OFFICE.

GEORGE H. GARDNER, OF BOSTON, MASSACHUSETTS.

PRIMARY BATTERY.

SPECIFICATION forming part of Letters Patent No. 543,931, dated August 6, 1895.

Application filed July 5, 1894. Serial No. 516,630. (No model.)

*To all whom it may concern:*

Be it known that I, GEORGE H. GARDNER, of Boston, in the county of Suffolk and State of Massachusetts, have invented a new and useful Improvement in Primary Batteries, of which the following, taken in connection with the accompanying drawings, is a specification.

My invention relates to a new and improved method of making an electrical contact between an element of a primary battery and the circuit-wires, and consists in attaching to a binding-post or its equivalent which is fixed in the bottom of the battery a metallic plate adapted to press against one element and thus form a conductor between the said element and the binding-post.

My invention is embodied in the device shown in the accompanying drawings, in which—

Figure 1 is a plan showing a battery of four cells. Fig. 2 is a vertical section of the same, taken on line X X of Fig. 1. Fig. 3 shows one of my spring-electrodes in perspective.

In the drawings, A represents a battery having four cells B B' B² B³. Each of these cells is provided with a carbon element C, a porous cup P, and a zinc element Z. The casing A of the battery may be made of hard rubber or of any suitable water and acid proof substance.

All of the parts above referred to are of ordinary construction and may be varied in shape and arrangement, as may be desired.

The carbon element C is represented as having a screw-electrode H with binding-nuts S S'.

The novel feature of my battery is the connector E E'. This consists of a flat metallic spring E having a shank E' and a screw-terminal R that passes through the base of the case and may be provided with a gasket or washer F to assist in making a water-tight joint with the bottom of the battery.

T represents a screw-nut which serves to hold the connector firmly in place.

The nut T' serves to fasten the circuit-wire.

The electrode E E' is so formed, bent, and located that it will always push against the zinc element when the same is *in situ*, and the parts are so arranged that whenever the zinc is put into its cell it must of necessity come in electrical contact with the said connector E E'. The zinc may be changed or turned end for end, so that the place of contact between it and the electrode E E' may be varied, so that if the zinc is thin or eaten through at one point a new place of contact may be had.

I claim—

In a primary battery, the combination of a binding post having a metallic connection passing through the bottom of the cell and terminating in a flat curved spring so arranged and located, as described, that in placing the zinc element into the cell, an automatic connection is made, substantially as and for the purpose set forth.

In testimony whereof I have signed my name to this specification, in the presence of two subscribing witnesses, on this 3d day of July, A. D. 1894.

GEORGE H. GARDNER.

Witnesses:
FRANK G. PARKER,
WILLIAM EASON.